April 29, 1941.  W. F. BERNSTEIN  2,240,252

OIL SEAL WITH ROTATABLE INNER SHELL

Filed Jan. 28, 1939

WILBURN F. BERNSTEIN
INVENTOR
PER

ATTORNEY

Patented Apr. 29, 1941

2,240,252

UNITED STATES PATENT OFFICE 2,240,252

OIL SEAL WITH ROTATABLE INNER SHELL

Wilburn F. Bernstein, Brookfield, Ill., assignor to Victor Manufacturing & Gasket Company, Chicago, Ill., a corporation of Illinois Application January 28, 1939, Serial No. 253,326

3 Claims. (Cl. 288—3)

This invention relates to an improved oil seal with a rotatable inner shell section of a confining or retaining shell, and has, for one of its principal objects, the provision of a sealing device for oils, greases, and other fluids which is adapted to retain the same in desired position with regard to a rotatable shaft which operates in some sort of a housing.

One of the important objects of this invention is to provide, in a single sealing element, a relatively fixed part and a rotatable portion, the fixed part being adapted to be mounted in the housing which surrounds the rotatable shaft, and the relatively moving part being adapted for a pressed fit or the like upon the shaft itself for rotation therewith.

A further important object of this invention is to provide, in a fluid seal of the class described, the combination of a plurality of metallic sections adapted to fit the housing and shaft respectively, and a flexible diaphragm or sealing element which is fixedly connected to one section and moves or rotates with regard to the other section.

Another important object is to provide, in a sealing device, a relatively simple structure which can be economically manufactured from a commercial standpoint and which, moreover, will be efficient and long-lived in operation.

Other and further important objects of the invention will be apparent from the disclosures in the accompanying drawing and following specification.

The invention, in a preferred form, is illustrated in the drawing and hereinafter more fully described.

Figure 1:
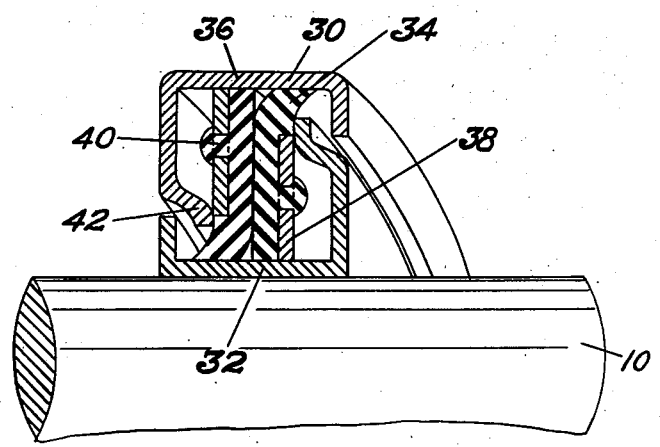
Figure 1 is a sectional view of one of the improved fluid seals of this invention, showing the same as applied to a rotatable shaft.

The reference numeral 10 indicates generally a rotatable shaft to which the improved seals of this invention are adapted to be applied.

Figure 2:
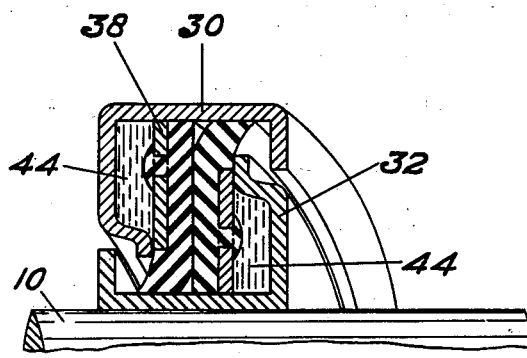
Figure 2 is a similar sectional view, illustrating a modified form of the invention.

The structure shown in Figures 1 and 2 embodies an outer relatively fixed channel section as shown at 30 adapted to be mounted in a surrounding housing, and an inner relatively rotatable channel section as illustrated at 32 adapted to be mounted on the rotatable shaft 10, and each includes a pair of diaphragms or sealing elements 34 and 36 respectively. Each of these diaphragms or sealing elements is also composed of vulcanized synthetic rubber or the like, the same being built or bonded onto a supporting metal washer 38, the metal washer having openings 40 therein whereby portions of the synthetic rubber are extruded therethrough during the vulcanizing process to produce a more positive contact and seal between the parts.

Each of the channel sections 30 and 32 forming the retaining shell has a portion 42 bent inwardly to actually contact the adjacent part of its respective diaphragm, thereby providing for a better sealing contact with the opposed portion of the seal itself and also producing a more unitary construction throughout.

The seal of Figure 2 is substantially the same as that just described with the exception that the space between the outer shell sections 30 and 32 and their respective washers 38 is preliminarily filled with some heavy grease or the like as illustrated at 44, this being to meet certain sealing requirements sometimes encountered in connection with the sealing of various chemical fluids which, in themselves, do not act as lubricants.

It will be noted that in the structures shown in Figures 1 and 2, there is a double sealing surface, one acting against the rotatable channel section which is fitted onto the shaft 10, and the other acting against the inner face of the outer channel section which is applied to the surrounding and relatively stationary housing. Obviously, a quite effective sealing action results from this construction, and this has been found particularly effective for heavy duty and special requirements.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. A unit fluid seal for sealing a rotatable shaft and its surrounding housing against the passage or escape of lubricants and other fluids, comprising a pair of annular, opposed channel-shaped sections one of which is mounted upon the shaft and the other secured within the housing whereby said sections rotate relative to each other, and a sealing element mounted in each section in juxtaposition and provided with a sealing lip in wiping contact with the interior of the opposed channel.

2. A self-contained fluid seal for sealing a rotatable shaft and its surrounding housing against the passage or escape of lubricants and other fluids, comprising a confining shell composed of opposed channel-shaped sections one of which is mounted on the shaft and the other secured within the housing whereby said sections rotate relative to each other, and a sealing element mounted in each section and provided with a sealing lip in wiping contact with the interior of the opposed channel section.

3. A fluid seal assembly for sealing a rotatable shaft and its surrounding housing against the escape or passage of lubricants and other fluids, comprising a pair of opposed channel-shaped sections one of which is mounted on the shaft and the other secured within the surrounding housing, a washer mounted in each section and a resilient sealing element bonded to each washer whereby said sections, their respective washers and sealing elements rotate relative to each other with the sealing elements in wiping contact with each other and with the interior of the opposed section.

WILBURN F. BERNSTEIN.